United States Patent [19]

Hanson et al.

[11] 4,407,327
[45] Oct. 4, 1983

[54] FLOW CONTROL VALVE

[75] Inventors: Lloyd D. Hanson; Robert M. Purton, both of Cerritos, Calif.

[73] Assignee: Dresser Industries, Inc., Dallas, Tex.

[21] Appl. No.: 256,876

[22] Filed: Apr. 24, 1981

[51] Int. Cl.³ .................... F16K 47/12; F16K 47/14
[52] U.S. Cl. ........................ 137/625.3; 137/625.37; 251/126; 251/127; 138/42; 138/43
[58] Field of Search .................. 137/625.37, 625.3; 251/127, 126; 138/42, 43

[56] References Cited

U.S. PATENT DOCUMENTS

| 3,529,628 | 9/1970 | Cummins | 137/625.3 |
| 3,856,049 | 12/1974 | Scull | 251/127 X |
| 4,000,878 | 1/1977 | Vick | 251/127 |
| 4,004,613 | 1/1977 | Purton et al. | 137/625.37 |

FOREIGN PATENT DOCUMENTS 131774 7/1978 Fed. Rep. of Germany ... 137/625.3
2728697 1/1979 Fed. Rep. of Germany ...... 251/127

Primary Examiner—Arnold Rosenthal
Attorney, Agent, or Firm—R. L. Van Winkle

[57] ABSTRACT

The improved flow control valve includes a hollow valve body having an inlet and an outlet and a valve member movable therein to control the flow through the valve. The valve also includes an orifice assembly located in the valve body encircling the valve member. The orifice assembly includes a perforated cylindrical member encircling the valve member and a plurality of annular discs encircling the cylindrical member. The discs include both orifice discs and spacer discs. The orifice discs are located between the spacer discs and each orifice disc is provided with a plurality of orifices. Each spacer disc is provided with a plurality of flow ports that are arranged to aligned serially with the orifices which provide a long curvilinear or spiral flow path through the orifice assembly.

5 Claims, 4 Drawing Figures

FLOW CONTROL VALVE

BACKGROUND OF THE INVENTION

This invention relates generally to flow control valves that are used to lower the pressure of fluid flowing therethrough. More particularly, but not by way of limitation, this invention relates to an improved flow control valve having a multiplicity of curvilinear flow paths through the valve that also includes a plurality of orifices located in each flow path.

U.S. Pat. No. 4,004,613 issued to R. M. Purton and R. B. Maddocks on Jan. 25, 1977, describes a valve that is used for similar purposes. However, the orifice assembly of that valve is entirely different than that of the present invention. In that valve, a series of orifice plates alternate with a plurality of spacer plates, but the orifice plates include a series of vertically disposed lands and a plurality of vertically oriented holes drilled in the orifice plates, while the spacer plates are imperforate.

Another somewhat similar valve is manufactured by Copes-Vulcan, Inc. Their valve is designated as the "Hush II Trim". The valve includes a plurality of cylindrical mmbers that make up the orifice assembly for the valve. The cylindrical members are concentrically arranged and each is provided with a plurality of orifices that are aligned to provide flow from the inlet to the outlet through the orifice assembly.

Both of the foregoing valves operate successfully, but the present valve provides a much longer flow path through the valve with many orifices provided for reducing the pressure over greater period of flow time. Thus, the valve functions more efficiently and reduces the noise level as the pressure is reduced. Also, it should be apparent from viewing the drawing of this application as compared to the prior art mentioned above, that the orifice discs and spacer discs can be manufactured much less expensively and by much simpler manufacturing techniques.

SUMMARY OF THE INVENTION

It is an object of this invention to provide an improved flow control valve that can be manufactured more easily at less cost and one that will function more efficiently and in a quieter manner to reduce pressure flowing therethrough.

This invention provides an improved flow control valve that includes a hollow valve body having an inlet and an outlet. A valve member is disposed in the valve body and is movable therein between positions opening and closing the valve. Orifice means disposed in the valve body between the inlet and outlet includes a perforated cylindrical member encircling the valve member. It also includes a plurality of alternating orifice discs and spacer discs encircling the perforated cylindrical member. Each of the orifice discs and spacer discs includes a plurality of radially and circumferentially spaced orifices and flow ports, respectively, which when radially displaced relative to each other, and assembled on the perforated cylindrical member, provide a curvilinear flow path through the valve presenting a multiplicity of orifices to the fluid flowing therethrough.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
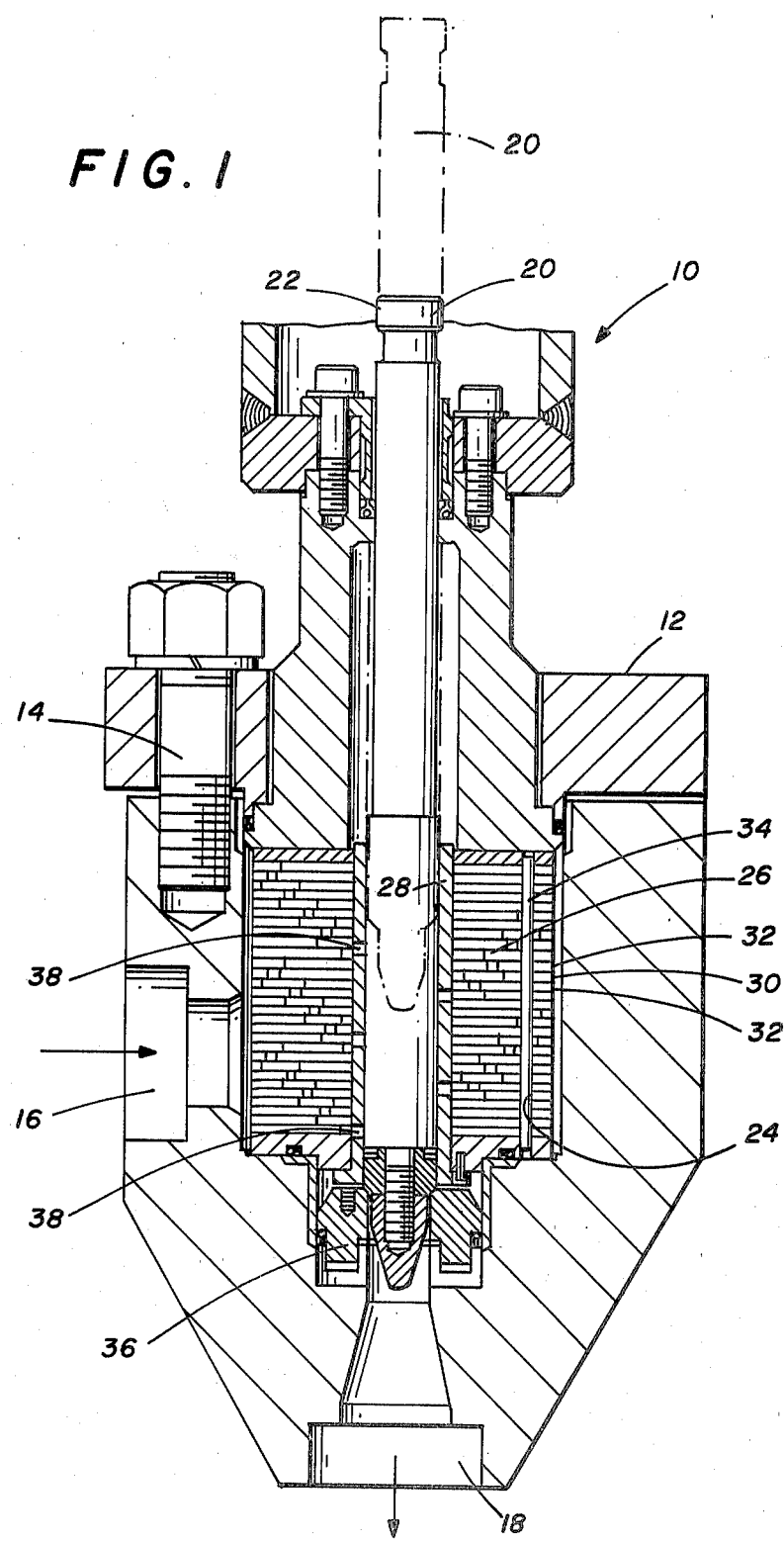
FIG. 1 is a cross section of a flow control valve constructed in accordance with the invention.

Referring to the drawing, and to FIG. 1 in particular, shown therein and generally designated by the reference character 10, is a pressure control valve that is constructed in accordance with the invention. As shown therein, the pressure control valve 10 includes a hollow valve body 12, which for manufacturing purposes, is made up of several parts held together by a plurality of threaded fasteners 14. The valve body 12 includes an inlet 16 and an outlet 18.

A valve member 20 is reciprocally positioned within the valve body 18 and has an upper end portion 22 that extends from the valve body 12 for connection with a valve operator (not shown).

Within the valve body 12, there is an annular cavity 24 into which is placed an orifice assembly 26. The orifice assembly 26 includes a perforated cylindrical member 28 that encircles the valve member 20. A stack of orifice discs 30 and spacer discs 32 are appropriately positioned in encircling relationship to the perforated member 28. The orifices disc 30 and spacer discs 32 are retained in the desired orientation relative to each other by a pin 34 that extends through aligned openings therein. The orifice discs 30 and spacer discs 32 will be described more fully in connection with the description of FIGS. 2 and 3.

As can be seen in FIG. 1, the valve body 12 also has an annular valve seat member 36 encircling the outlet 18. The valve seat 36 is arranged to be engaged by the lower end of the valve member 20 when it is in closed position to prevent flow from the inlet 16 to the outlet 18. It should also be pointed out that the perforated member 28 is provided with a plurality of perforations 38 that are in communication with the orifice assembly 26 as will be described. It can also be seen in FIG. 1 that the movement of the valve member 20 through the perforated cylindrical member 28 will open and close, sequentially, the perforations 38 providing for a greater or lesser volume of flow through the valve 12.

Figure 2:
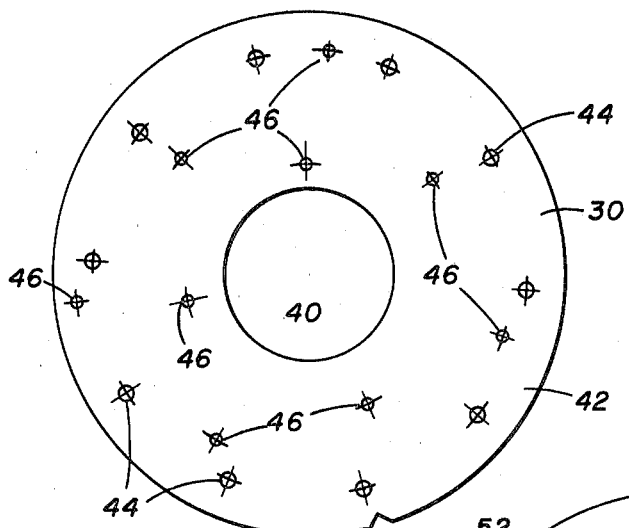
FIG. 2 is an enlarged plan view of an orifice disc constructed in accordance with the invention and useful in the valve of FIG. 1.

FIG. 2 is a plan view of one of the orifice discs 30 removed from the valve 12 so that the details of construction can be clearly seen. As illustrated, the orifice disc 30 is an annular plate-like member, having an opening 40 extending therethrough that is sized to receive the cylindrical member 28. The outer periphery 42 of the orifice disc 30 is slightly smaller than the cavity 24 in the valve body 12 allowing an annular space on the exterior thereof to permit fluid to reach the exterior of the orifice assembly 26.

The orifice disc 30 is provided with a plurality of equally spaced orientation holes 44 for receiving the orientation member 34. The orientation holes are spaced about the periphery of the orifice disc 30 so that it can be oriented with relation to the adjacent spacer discs 32 as will be described.

The orifice disc 30 also includes a plurality of orifices 46 that extend therethrough in a particular spaced relationship, both circumferentially and radially, that is also designed to relate to the adjacent spacer plate 32 as will be described. The size of the orifices 46 will of course be determined by the operating characteristics desired of the valve 10.

Figure 3:
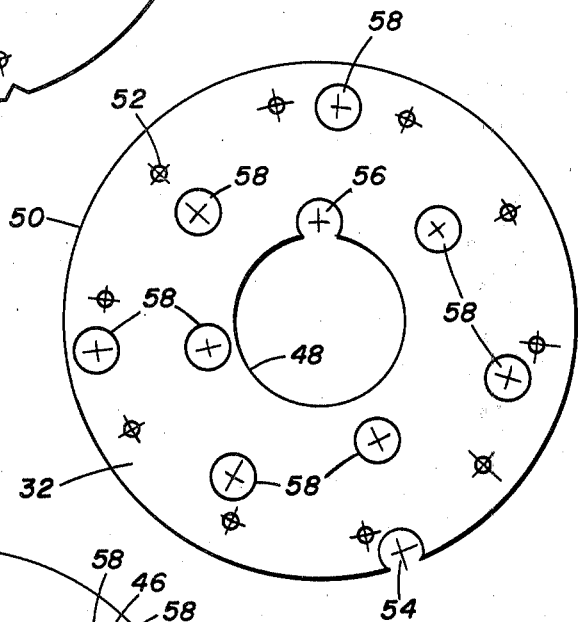
FIG. 3 is a plan view of a spacer disc that is also manufactured in accordance with the invention and that is used in conjunction with the orifice disc of FIG. 2.

Referring to FIG. 3, shown therein is a plan view of one spacer plate 32 that has also been removed from the valve 10. The spacer plate 32 includes an opening 48 that extends therethrough and is sized to receive the perforated cylindrical member 28. The spacer disc 32 also includes an outer periphery 50 that is preferably the same diameter as the outer periphery 42 of the orifice disc 30. In any event, the outer periphery should be sized so that it is slightly smaller than the diameter of the cavity 24 located in the valve body 12.

The spacer disc 32 like the orifice disc 30 also includes a plurality of orientation holes 52 that are spaced about the periphery thereof to receive the orientation member 34.

The spacer disc 32 has an inlet flow port 54 that intersects the outer periphery 50 of the spacer disc 32 and an outlet flow port 56 that intersects the inner periphery 48 of the spacer disc 32. The outlet flow port 56 is disposed adjacent to one of the perforations 38 extending through the periphery cylindrical member 28 when assembled in the valve 10. The spacer disc 32 also includes a plurality of intermediate flow ports 58 that are disposed at radially and circumferentially spaced positions about the spacer disc 32. The flow ports 58 are located, functionally, between the of the inlet flow ports 54 and outlet flow ports 56 which will be in different discs 32.

The orifice disc 30 illustrated in FIG. 2 includes nine of the spaced orifices 46 therein, while the number of flow ports in the spacer disc 32 is ten. Accordingly, in a stack of the discs 30 and 32, ten of the spacer plates 32 are positioned with nine of the orifice discs 30 located therebetween. Such an arrangement provides for one complete curvilinear flow path from the inlet 16 to the outlet 18 through the valve 10 as is illustrated schematically in FIG. 4.

Figure 4:
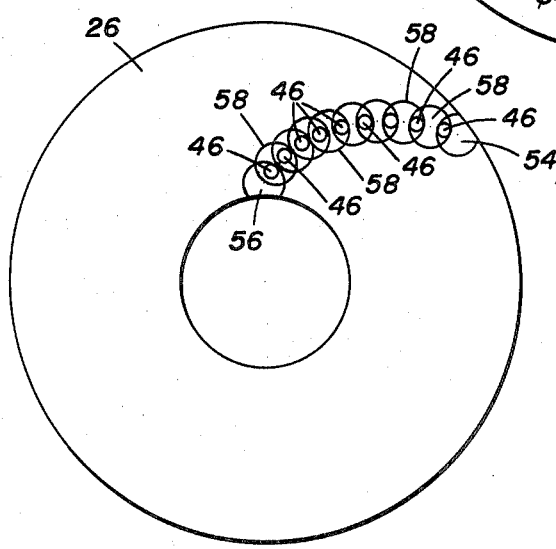
FIG. 4 is a schematic view of a single curvilinear flow path through the orifice assembly of the valve of FIG. 1.

As shown therein, the inlet flow port 54 is in communication with a single orifice 46 and similarly, the outlet flow port 56 is in communication with a single orifice 46. However, it will be appreciated that the inlet 54 is located in the uppermost orifice disc 32 of the stack of ten spacer and orifice discs while the outlet port 56 is located in the lowermost of the ten spacer discs forming the stack. The orifice 46 in communication with the inlet flow port 54, is located in the first orifice disc 30 which is located just beneath the spacer disc 32 in which the inlet port 54 is located. The first intermediate flow port 58, which is located inwardly of the inlet flow port 54 and in communication with the just mentioned orifice 46, encompasses a second orifice 46 that is located in the orifice disc 30 located just below the second spacer plate 32 in which the first flow port 58 is located. Similarly, each of the orifices 46 and flow ports 58 illustrated are located in successively lower members until the complete curvilinear flowpath illustrated in FIG. 4 is achieved.

If the discs 30 and 32 are each 1/16 inch thick, a stack of 19 discs (including ten spacer discs 32 and nine orifice discs 30) will be approximately 4¾ inches high. Thus, it can be seen that the spiraling curvilinear flow path shown in FIG. 4 extends from the outside of the orifice assembly 26 to the inside of the perforated member 28 and from its inlet flow port 54 downwardly for approximately 4¾ inches to its outlet flow port 56. Thus, an extremely long flowpath is provided that also includes nine different orifices through which the fluid must flow while dissipating its energy as the pressure drops.

As will be appreciated from viewing FIGS. 2 and 3, the plates (unless it is desired to vary the orifice sizes) are substantially identical and thus each plate has its own inlet and outlet flow ports 54 and 56 and each begins and ends a new curvilinear flow path through the orifice assembly 26. However, and as can be appreciated, each stack of ten spacer members and nine orifice members provides one complete curvilinear flow path through the orifice assembly 26.

The number of complete curvilinear flow paths through the orifice assembly 26 can be calculated, since the number of curvilinear flow paths through the orifice assembly 26 is equal to one plus the number of spacer discs 32 minus ten. Thus, with thirty spacer discs 32 and the appropriate number of orifice discs 30, the number flow paths in the valve will be equal to one plus thirty minus ten or twenty one complete flow paths through the valve 10.

It can be seen that the valve 10 not only provides for a rather long flow path, but it also provides for a considerable number of such flow paths considering the amount of space given in the valve.

While the flow ports 58 and orifices 46 have been illustrated as circular, they can be formed with other configurations if desired. As previously mentioned, the orifices 46 can be varied in size to different pressure reduction characteristics as fluid flows through the valve 10.

Having described but a single embodiment of the invention, it can be appreciated that the forgoing detailed description is presented by way of example only and that many changes can be made thereto without departing from the spirit of the invention.

The embodiments of the invention in which an exclusive property or privilege is claimed are defined as follows:

1. An improved pressure control valve including a body having an inlet and an outlet, a valve seat encircling said outlet, a valve member movable in a longitudinal direction in said body toward and away from said seat, and orifice means located in said body between said inlet and outlet and cooperable with said valve member to control flow through said outlet, said orifice means comprising:

a perforated sleeve member located in said body and encircling a portion of said valve member whereby movement of said valve member opens and closes said perforations;

a plurality of orifice discs encircling said sleeve member, each said orifice disc having a plurality of radially and circumferentially spaced orifices extending therethrough;

a plurality of spacer discs encircling said sleeve member in alternating stacked relation with said orifice discs, each said spacer disc having a plurality of radially and circumferentially spaced flow ports extending therethrough, each said port being larger than each said orifice and in fluid communication with at least one of said orifices; and, each said orifice and spacer disc located in radially displaced position relative to each other serially arranging said ports and orifices forming a multiplicity of elongated curvilinear flow paths through said discs extending generally longitudinally of said valve for dissipating the energy of fluid flowing through said valve.

2. The improved valve of claim 1 wherein each said spacer disc includes:
an outlet flow port located adjacent to a perforation in said sleeve member and in communication with one of said orifices;
an inlet flow port located adjacent to said inlet and in communication with one of said orifices; and, wherein
the remainder of said flow ports are located intermediate said inlet and outlet flow ports and arranged to be in communication with a pair of said orifices whereby said remainder of said ports provides for fluid flow between orifices located in orifice discs disposed on each side of one of said spacer discs.

3. The improved valve of claim 2 wherein:
all said spacer discs are substantially identical in configuration;
all said orifice discs are substantially identical in configuration; and,
each of said discs includes orientation means for positioning each disc radially relative to the other to provide the curvilinear flow paths through the orifice means.

4. The improved valve of claim 3 wherein the number of complete curvilinear flow paths through said valve is equal to one plus the number of spacer discs minus ten.

5. The improved valve of claims 3 or 4 wherein said orifice means includes:
a stack of ten spacer discs and nine orifice discs; each said spacer disc includes ten flow ports; each said orifice disc includes nine orifices; and, each said stack provides one curvilinear flow path from the inlet to the outlet of said valve passing through nine orifices.

* * * * *